May 19, 1931.  S. G. DOWN  1,805,655
COOLING DEVICE FOR AUTOMOTIVE BRAKES
Filed Feb. 26, 1927
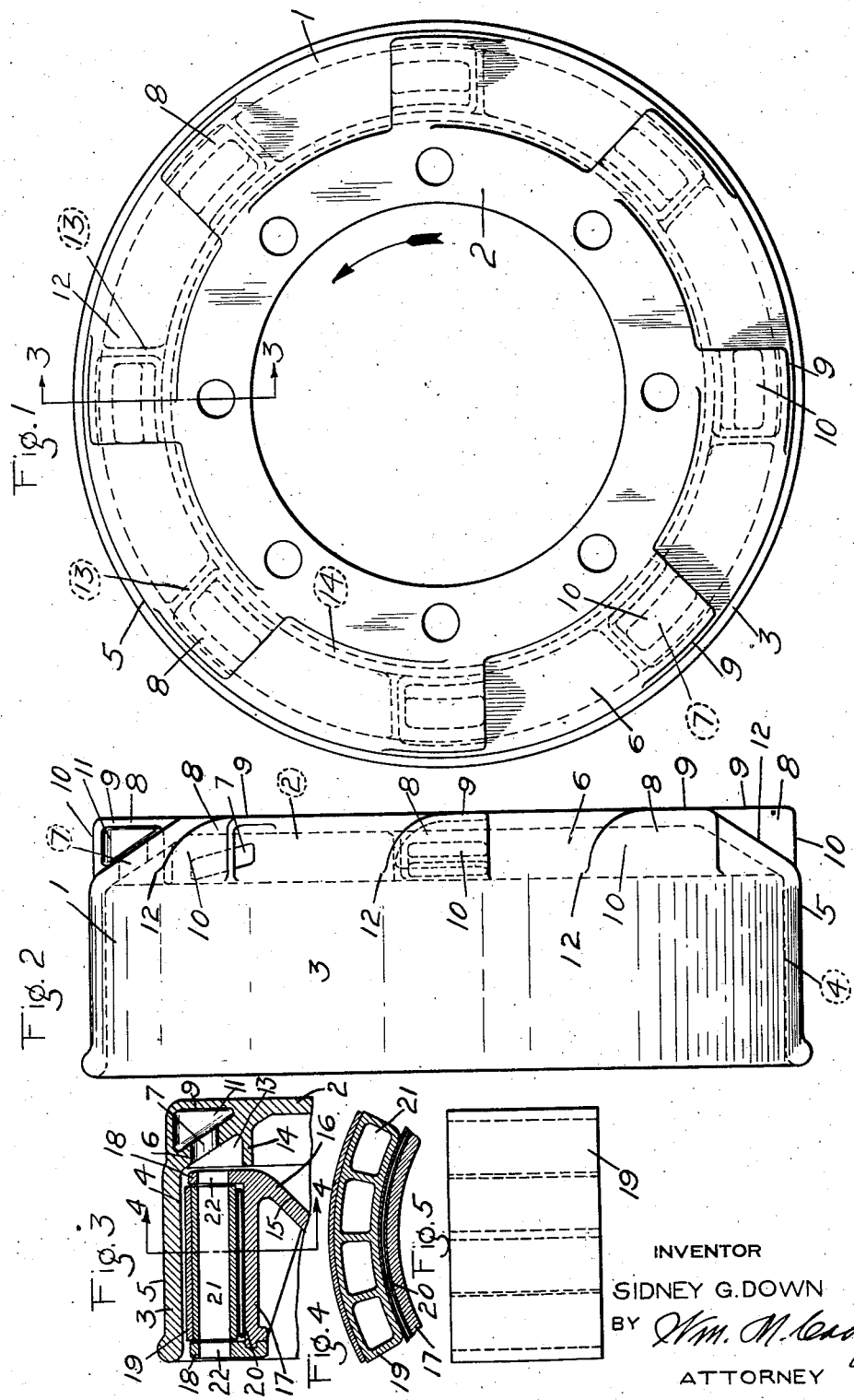
INVENTOR
SIDNEY G. DOWN
BY
ATTORNEY Patented May 19, 1931

1,805,655

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

COOLING DEVICE FOR AUTOMOTIVE BRAKES

Application filed February 26, 1927. Serial No. 171,182.

This invention relates to brakes for automotive vehicles, and more particularly to that type of brake in which a plurality of radially arranged arcuate brake shoes are movable outwardly into engagement with the inner braking surface of a brake drum to apply the brakes and inwardly to release the brakes, and has for an object the provision of novel means for cooling and tending to maintain cool, the brake shoes, brake lining, brake drum and associated parts.

Another object of the invention is to provide an automotive vehicle brake drum with means for inducing currents of air to flow through the drum for the purpose of maintaining the drum and the parts of the brake associated therewith interiorly, comparatively cool.

These and other objects will be apparent from the following description.

Referring to the drawings in which like reference characters refer to like parts; Fig. 1 is an end elevational view of a brake drum embodying a portion of the invention; Fig. 2 is a side elevational view of the same; Fig. 3 is a sectional view taken on the line 3—3 of Fig. 1, the brake spider, brake shoes and associated parts being illustrated; Fig. 4 is a sectional view taken on the line 4—4 of Fig. 3, the drum being omitted; and Fig. 5 is a plan or face view of one of the brake shoes.

Referring now in detail to the drawing, the reference character 1 indicates a brake drum having a vertically disposed web 2 which is adapted to be secured to an automotive vehicle wheel (not shown). This drum also has a circumferential flange 3 which provides an interior braking surface 4 and if desired may also provide an exterior braking surface 5, either or both of which surfaces are adapted to be engaged by the usual brake lining (not shown) or brake shoes. Connecting the web 2 and the flange 3 there is an integral sloping web 6 which has openings 7 formed therein. Formed on the exterior of the drum and extending outwardly from the web 6, are hollow projections or hoods 8 each having one of their ends open. Each of these projections comprises walls 9 and 10 and these walls together with a portion of the web 6 define a pocket 11 which communicates with the interior of the brake drum through one of the openings 7. The wall 9, for a short distance is preferably in substantially the same vertical plane as the web 2 and then curved or sloped, so that at the place indicated by the reference character 12, it merges into the web 6, thus forming a surface for directing air currents to the opening 7.

Adjacent each one of the openings 7, and interiorly of the brake drum, a web 13 is provided which is preferably integral with, and projects from, the interior surface of the web 6, and at one end is connected with an interior curved lug 14 which is preferably concentric with the flange 3. The webs 13 and lug 14 are so disposed relative to the web 6 and the openings 7 formed therein that the air which may enter the drum may be directed in a direction across the drum for a purpose hereinafter more fully set forth.

Positioned within the brake drum there is a non-rotating brake support 15 which may be connected or formed integral with any suitable part of an automotive vehicle. This support may be made of any suitable form, but preferably comprises a main web 16 and a horizontally disposed circular web 17 integral therewith, such web being concentric with the flange 3 of the brake drum. Extending outwardly from the web 17 and spaced apart from each other transversely of the support, are flanges 18 which may be integral with the support or may be made separate and secured thereto. Between these flanges a plurality of brake shoes 19 are mounted on the support, which shoes, as is usual, are preferably of arcuate form and are arranged radially around the support. To operate these shoes any suitable means may be used, but for illustrative purposes only the usual expansion tube 20 has been shown, which tube when expanded will force the shoes into braking engagement with the surface 4 of the drum and as the tube is being collapsed, will permit the shoes to be returned to their normal brake release position. Each of the brake shoes has air conducting channels 21 formed therethrough, which channels are adapted to register at all times with openings 22 formed in the flanges 18 of the support 15.

Assuming the drum and the several parts of the brake, just described, to be applied to a vehicle, and the drum to be rotated in the direction as indicated by the arrow in Fig. 1, air will be caught up by the projections or hoods 8 and forced through the openings 7 to the interior of the drum where the webs 13 and lug 14 will direct such air toward the brake support 15 and will force the air through the openings 22 in the adjacent flange 18 of the support and through the channels 21 formed in the brake shoes 19 and will be finally exhausted through the openings 22 in the other flange 18 of the support 15. It will be noted that all of the air entering the drum will not be forced through the brake support and the brake shoes but some of it will, when the brake has been released, flow between the brake shoes and the inner surface 4 of the flange 3.

Assuming the drum to be stationary and it is in a heated condition, due to a long service application of the brake, the heated air in the drum will escape through the openings 7 at or near the top of the drum, and cool air will be admitted to the interior of the drum through the openings 7 at or near the bottom of the drum, thus these currents of air will effectively cool the drum when the drum is stationary.

From the foregoing description it will be seen that I have provided a cooling or ventilating system for the brake drum and its associated parts which will reduce to a minimum the liability of the over-heating of these brake parts and the consequent damage thereto.

The brake drum has been illustrated and described as a single integral member, but it will be understood that the several parts thereof may be made separate and suitably secured together. It will also be apparent to those skilled in the art to which this invention appertains, that changes may be made in the details and arrangement of the several parts of the brake without departing from the spirit and scope of the appended claims.

Having now described my invention, what I claim as new and desire to secure by Letters Patent, is:

1. A brake drum for automotive vehicles, said drum carrying means interiorly and exteriorly thereof for inducing air currents therethrough.

2. A brake drum for automotive vehicles, said drum having a ventilating opening formed therein, a projection on the exterior of said drum for forcing air into said opening, and means on the interior of said drum, adjacent said opening, for directing the air flowing through said opening.

3. A brake drum for automotive vehicles, said drum having ventilating openings formed therein, and means within and forming a part of said drum adjacent said openings for directing, interiorly of the drum, the ventilating medium flowing through said openings.

4. A brake drum for automotive vehicles, said drum having ventilating openings formed therein, and means carried by said drum adjacent said openings, exteriorly and interiorly of the drum, for directing currents of air from the exterior to the interior of the drum.

5. A brake drum for automotive vehicles, said drum having a web adapted to be secured to a wheel of said vehicle, a brake flange, a sloping web connecting said flange and securing web, said sloping web having ventilating openings formed therein, means projecting from said sloping web, exteriorly of the drum, for inducing air to flow through said openings, and means projecting from said web, interiorly of the drum for inducing the air flowing through said opening, to flow against said brake flange.

6. A brake drum for automotive vehicles, said drum having a vertically disposed securing web adapted to be secured to a wheel of said vehicle, a horizontally disposed brake flange, a sloping web connecting said securing web and flange, and ventilating means for said drum associated with said sloping web and arranged within the vertical plane of said sloping web.

7. The combination with a brake for automotive vehicles, of a support for a portion of said brake, a brake drum, brake shoes mounted on said support and movable into or out of engagement with said drum, and means exteriorly and interiorly of said drum for inducing air to flow through said shoes said means being carried by said drum.

8. The combination with a brake for automotive vehicles, of a support for a portion of said brake, a brake drum, brake shoes mounted on said support and movable into and out of engagement with said drum, means on the exterior of said drum for directing currents of air to the interior of said drum, and means carried by said drum and arranged interiorly thereof adapted to direct said currents of air to said shoes.

9. A brake drum for automotive vehicles, said drum comprising a sloping web having a ventilating opening formed therein, a hood projecting from one side of said web adapted to direct a current of air through said opening to the interior of said drum.

10. The combination with a brake for automotive vehicles, of a support for a portion of said brake, a brake drum having ventilating openings formed therein, brake shoes mounted on said support and movable into and out of engagement with said drum, said shoes having ventilating passages therethrough with which the openings in said drum are adapted to register, and means on said drum and arranged interiorly thereof for directing air currents, entering said drum through said openings, to the ventilating passages through said shoes.

11. A brake drum for automotive vehicles, said drum having a securing web, a brake flange, a web connecting said securing web and flange and having a ventilating opening formed therein, and a projection on the exterior of said drum within the outside lines of said securing web and flange for conducting air to said opening.

12. A brake drum for automotive vehicles, said drum having ventilating openings formed therein, a securing web for said drum, a braking flange, and hood means on the exterior of said drum arranged wholly within the outside lines of said web and flange for forcing air to flow through said openings into the interior of the drum.

In testimony whereof I have hereunto set my hand.

SIDNEY G. DOWN.